United States Patent
Wu (10) Patent No.: US 12,125,309 B2
(45) Date of Patent: Oct. 22, 2024

(54) FINGERPRINT MODULE AND ELECTRONIC DEVICE

(71) Applicant: VIVO MOBILE COMMUNICATION CO., LTD., Dongguan (CN)

(72) Inventor: Huaping Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/215,896

(22) Filed: Jun. 29, 2023

(65) Prior Publication Data

US 2023/0343131 A1    Oct. 26, 2023

Related U.S. Application Data (63) Continuation of application No. PCT/CN2021/141688, filed on Dec. 27, 2021.

(30) Foreign Application Priority Data

Dec. 31, 2020 (CN) .......................... 202011640141.1

(51) Int. Cl.
*G06V 40/13* (2022.01)

(52) U.S. Cl.
CPC ...... *G06V 40/1318* (2022.01); *G06V 40/1329* (2022.01)

(58) Field of Classification Search
None
See application file for complete search history.

(56) References Cited

U.S. PATENT DOCUMENTS

| | | | |
|---|---|---|---|
| 2022/0180653 A1* | 6/2022 | Bouthinon | H04M 1/0266 |
| 2022/0260760 A1* | 8/2022 | Yang | G06V 40/1318 |
| 2023/0135045 A1* | 5/2023 | Pan | G06F 1/1684 |
| | | | 361/679.27 |

FOREIGN PATENT DOCUMENTS

| | | |
|---|---|---|
| CN | 107358216 A | 11/2017 |
| CN | 110720106 A | 1/2020 |
| CN | 111323853 A | 6/2020 |
| CN | 112712039 A | 4/2021 |

(Continued)

OTHER PUBLICATIONS

International Search Report issued in corresponding International Application No. PCT/CN2021/141688, mailed Mar. 30, 2022, 4 pages.

(Continued)

*Primary Examiner* — Joseph R Haley
(74) *Attorney, Agent, or Firm* — IPX PLLC (57) ABSTRACT

A fingerprint apparatus and an electronic device are provided. The fingerprint apparatus includes a photosensitive unit, a microlens film, and a support part. The photosensitive unit and a display of the electronic device are arranged to be opposite to each other. The microlens film is disposed between the photosensitive unit and the display. There is an assembly gap between the microlens film and the display, and a first surface, facing the display, of the microlens film is provided with the support part. A first distance between the support part and the display is smaller than a second distance between the microlens film and the display. The assembly gap has a first refractive index, the display has a second refractive index, and the microlens film has a third refractive index.

20 Claims, 5 Drawing Sheets

(56) References Cited

FOREIGN PATENT DOCUMENTS

| | | |
|---|---|---|
| WO | 2018006475 A1 | 1/2018 |
| WO | 2020119289 A1 | 6/2020 |
| WO | 2020146985 A1 | 7/2020 |
| WO | 2020177032 A1 | 9/2020 |
| WO | 2020211062 A1 | 10/2020 |

OTHER PUBLICATIONS

Extended European Search Report issued in related European Application No. 21914271.8, mailed May 31, 2024, 7 pages.

* cited by examiner

FIG. 10

FINGERPRINT MODULE AND ELECTRONIC DEVICE

CROSS-REFERENCE TO RELATED APPLICATIONS

This application is a continuation of International Application No. PCT/CN2021/141688, filed on Dec. 27, 2021, which claims priority to Chinese Patent Application No. 202011640141.1, filed on Dec. 31, 2020. The entire contents of each of the above-identified applications are expressly incorporated herein by reference.

TECHNICAL FIELD

This application relates to the field of communication technologies, and in particular to a fingerprint module and an electronic device.

BACKGROUND

With the rapid development of electronic devices, the electronic devices are used increasingly widely, for example, mobile phones, tablet computers, and the like play a growing number of roles in people's work, life, entertainment, and the like.

In the related art, the electronic device includes a fingerprint module and a display module. The fingerprint module is disposed below the display module, and the display module emits light. After the light is refracted by a user's finger, part of the light enters the fingerprint module, to recognize a user's fingerprint. To improve optical performance of the fingerprint module, a microlens film may be pasted on a photosensitive unit of the fingerprint module. The microlens film can change scattered light into parallel light, improving the optical performance of the fingerprint module.

It is found that the related art has the following problems: When a user performs fingerprint unlock, the display module is easily deformed, causing the display module to contact a top of the microlens film. This enables large-angle light passing through the microlens to interfere with each other and form interference fringes, further affecting a fingerprint image, and resulting in poor imaging quality of the fingerprint module.

SUMMARY

Embodiments of this application are intended to provide a fingerprint apparatus and an electronic device.

According to a first aspect, an embodiment of this application provides a fingerprint apparatus. The fingerprint apparatus is used in an electronic device and includes a photosensitive unit, a microlens film, and a support part.

The photosensitive unit and a display of the electronic device are arranged to be opposite to each other. The microlens film is disposed between the photosensitive unit and the display. There is an assembly gap between the microlens film and the display, and a first surface, facing the display, of the microlens film is provided with the support part. A first distance between the support part and the display is smaller than a second distance between the microlens film and the display.

The assembly gap has a first refractive index, the display has a second refractive index, and the microlens film has a third refractive index. The first refractive index is different from the second refractive index, and the first refractive index is different from the third refractive index.

According to a second aspect, an electronic device is provided. The electronic device includes a light-transmitting cover plate, a display, and the foregoing fingerprint apparatus. The light-transmitting cover plate covers the display, and the fingerprint apparatus is located on a side, away from the light-transmitting cover plate, of the display.

In this embodiment of this application, a first surface, facing the display, of a microlens film is provided with a support part. A first distance between the support part and the display is smaller than a second distance between the microlens film and the display. In other words, when the display is deformed, the display contacts the support part, but does not directly contact the microlens film. Therefore, after light passes through the display, because a refractive index of an assembly gap is different from a refractive index of the display and a refractive index of the microlens film, large-angle light is easily refracted or reflected when entering the microlens film, and then it is difficult for the large-angle light to form interference fringes, to improve imaging quality of the fingerprint apparatus.

DETAILED DESCRIPTION

The following describes the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

Terms "first" and "second" in the specification and claims of this application are used to distinguish between similar objects, and do not need to be used to describe a specific order or sequence. It should be understood that the data used in this way is interchangeable in appropriate circumstances so that the embodiments of this application described can be implemented in other orders than the order illustrated or described herein. In addition, in the specification and the claims, "and/or" represents at least one of connected objects, and a character "/" generally represents an "or" relationship between associated objects.

A fingerprint module provided in an embodiment of this application will be described in detail below through specific embodiments and application scenarios with reference to the accompanying drawings.

Refer to FIG. 1 to FIG. 10. Embodiments of this application disclose a fingerprint module 100. The fingerprint module 100 is used in an electronic device, to achieve a fingerprint recognition function of the electronic device. The disclosed fingerprint module 100 includes a photosensitive unit 110, a microlens film 120, and a support part 130.

The photosensitive unit 110 is configured to receive an optical signal and can convert the optical signal into image information. The photosensitive unit 110 and a display module 200 of the electronic device are arranged to be opposite to each other. The microlens film 120 can collimate light, to change scattered light into parallel light, reducing waste of light. This increases light entering the photosensitive unit 110 and improves working performance of the photosensitive unit 110.

There is an assembly gap 140 between the microlens film 120 and the display module 200. A first surface, facing the display module 200, of the microlens film 120 is provided with the support part 130. A first distance between the support part 130 and the display module 200 is smaller than a second distance between the microlens film 120 and the display module 200.

The assembly gap 140 has a first refractive index, the display module 200 has a second refractive index, and the microlens film 120 has a third refractive index. The first refractive index is different from the second refractive index, and the first refractive index is different from the third refractive index.

When the fingerprint module 100 works, light passes through the display module 200, passes through the microlens film 120, and then enters the photosensitive unit 110. After passing through a photodiode in the photosensitive unit 110, a light signal is converted into an electrical signal. The electrical signal is converted by an operational amplifier and ADC to generate a digital image signal. The digital image signal is processed by a processor in the electronic device to generate a fingerprint texture image.

In some implementations, the assembly gap 140 is filled with air. Therefore, the first refractive index may a refractive index of the air. When the first distance between the support part 130 and the display module 200 is zero, the support part 130 contacts the display module 200. When the first distance between the support part 130 and the display module 200 is greater than zero, the display module 200 without deformation does not contact the support part 130. The first refractive index may be smaller than the second refractive index and smaller than the third refractive index. In some implementations, the assembly gap 140 may also be filled with an inert gas, or the assembly gap 140 is in a vacuum state. Similarly, the first refractive index may also be smaller than the second refractive index and smaller than the third refractive index.

In embodiments disclosed in this application, when the display module 200 is deformed, the display module 200 contacts the support part 130, but does not directly contact the microlens film 120. Therefore, after light passes through the display module 200, because the refractive index of the assembly gap 140 is different from the refractive index of the display module 200 and the refractive index of the microlens film 120, large-angle light is easily refracted or reflected when entering the microlens film 120, and then it is difficult for the large-angle light to form interference fringes, to improve imaging quality of the fingerprint module 100.

In addition, the support part 130 can enhance bending resistance of the display module 200, preventing the display module 200 from being damaged due to excessive deformation.

In the foregoing embodiment, when small-angle light passes through the support part 130, a part of the small-angle light passing through the support part 130 is refracted by the support part 130, to become parallel light and enter the photosensitive unit 110. Another part of the small-angle light passes through the assembly gap 140 and is refracted by the microlens film 120, to become parallel light and enter the photosensitive unit 110.

After passing through the support part 130, a part of large-angle light is reflected and absorbed, and another part of the large-angle light is refracted, passes through the microlens film 120 and enters the photosensitive unit 110 for imaging by the photosensitive unit 110. Therefore, light entering the photosensitive unit 110 is increased, and work performance of the photosensitive unit 110 is improved.

In some implementations, one end of the support part 130 may be disposed on the first surface, and a second end of the support part 130 may be a first free end. When the display module 200 is in a deformation state, the first free end can contact the display module 200. In this case, the first distance is greater than zero. When the display module 200 is forced to bend, the first distance can play a buffering role, so that a stress between the display module 200 and the fingerprint module 100 is relatively small, and the fingerprint module 100 and the display module 200 are not easily damaged.

In some implementations, the support part 130 and the microlens film 120 may be made of a same light-transmitting material, or the support part 130 and the microlens film 120 may be made of different light-transmitting materials, which is not limited herein. The support part 130 may have a plurality of structures. For example, the support part 130 may be a cylinder, a circular truncated cone, a polygonal cylinder, or a polygonal cone-like structure. The support part 130 may also have another structure, which is not limited herein.

In some implementations, there may be a plurality of support parts 130, and the plurality of support parts 130 may be arranged on the first surface at intervals. In this solution, a support area of the support parts 130 is further increased, further preventing the display module 200 from contacting the microlens film 120. In addition, a support force for the display module 200 is further increased, further improving bending resistance of the display module 200.

In some implementations, the plurality of support parts 130 may be arranged in an array on the first surface, and outer surfaces of the support parts 130 are provided with first color filter layers. It is known that light intensity of different wavelengths reflected by a finger and another object is different. Therefore, the finger and the another object can be distinguished by a difference in light intensity of different wavelengths by using the first color filter layer, to achieve anti-counterfeiting detection of an optical path and further improve reliability of the electronic fingerprint module 100.

In some implementations, in a first arrangement direction of the plurality of support parts 130, colors of filtered light corresponding to the first color filter layers of two adjacent support parts 130 are different. In this case, the first color filter layers can detect light with different wavelengths, further improving reliability of the anti-counterfeiting detection.

In some implementations, the colors of filtered light corresponding to the first color filter layers may include red, blue, and green. Therefore, the colors are alternately arranged based on three primary colors. Other colors may also be selected, which is not limited herein.

In some implementations, the photosensitive unit 110 may have a plurality of pixel regions 111. The plurality of pixel regions 111 may be arranged at intervals, and at least one support part 130 may be disposed in a region that is corresponding to each pixel region 111 and that is on the first surface. In a direction perpendicular to the photosensitive unit 110, a projection of the at least one support part 130 may be located in the pixel region 111 corresponding to the support part 130. The support part 130 affects only the pixel region 111 corresponding to the support part 130, and does not affect other pixel regions 111. Therefore, an influence on entire fingerprint imaging is reduced.

Further, the projection of the at least one support part 130 coincides with the pixel region 111 corresponding to the support part 130. A cross-sectional area of the pixel region 111 is the same as a cross-sectional area of the support part 130, to better facilitate design and manufacturing of the photosensitive unit.

Figure 1:
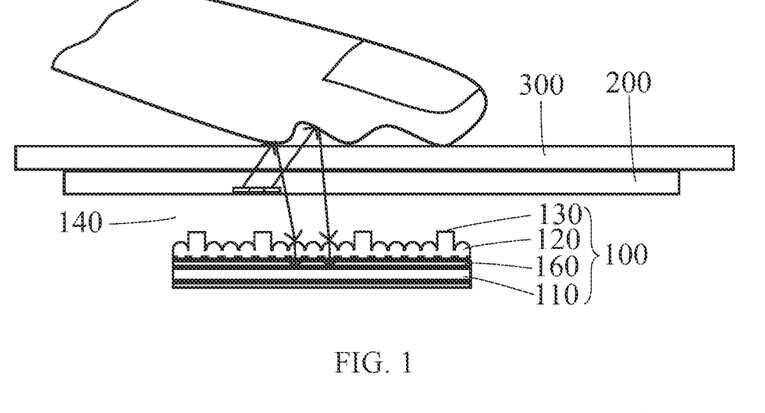
FIG. 1 is a first schematic diagram of a structure of an electronic device according to an embodiment of this application.
Figure 2:
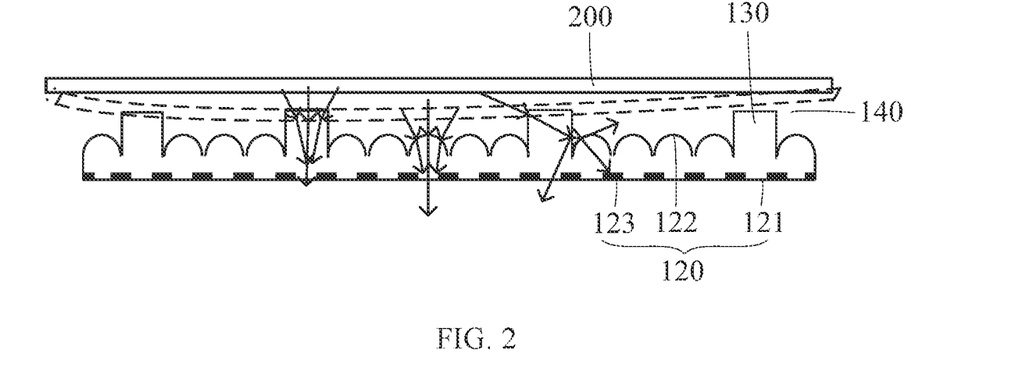
FIG. 2 is a schematic diagram of a structure of a bent display module in the electronic device according to an embodiment of this application.
Figure 3:
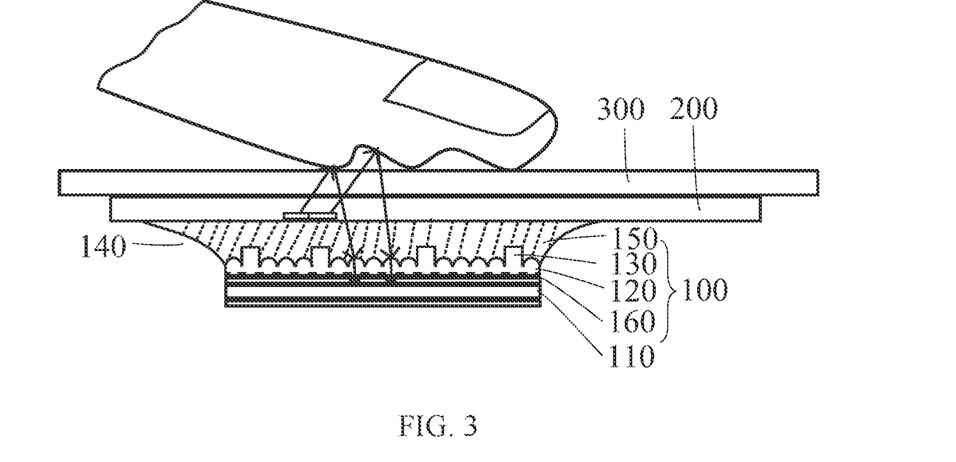
FIG. 3 is a second schematic diagram of a structure of an electronic device according to an embodiment of this application.
Figure 4:
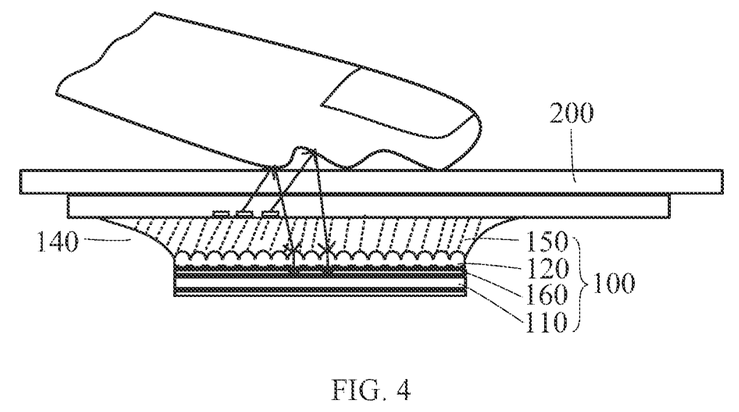
FIG. 4 is a third schematic diagram of a structure of an electronic device according to an embodiment of this application.
Figure 5:
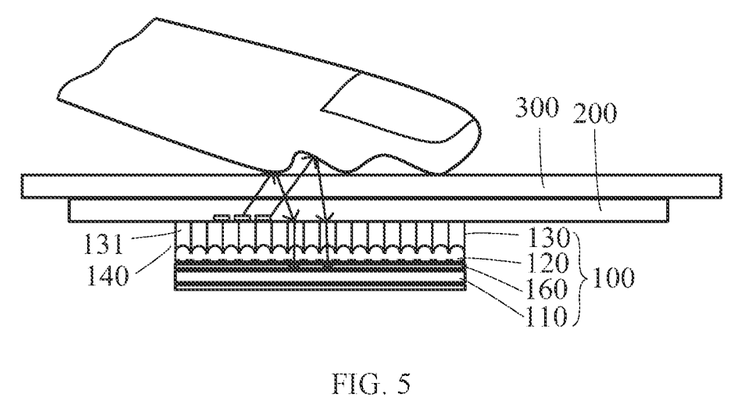
FIG. 5 is a fourth schematic diagram of a structure of an electronic device according to an embodiment of this application.
Figure 6:
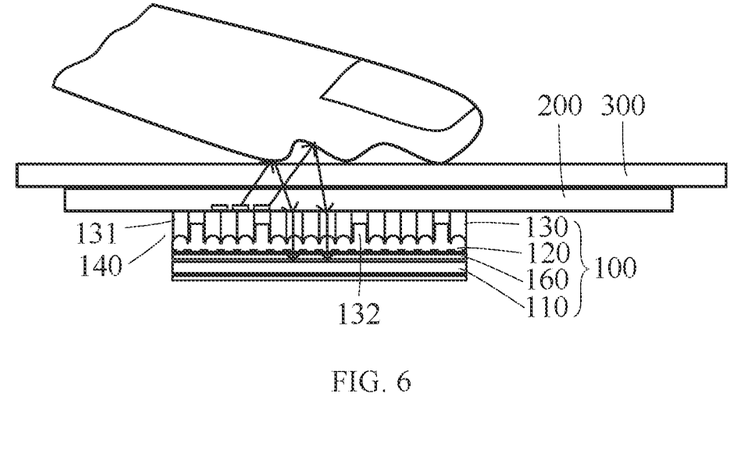
FIG. 6 is a fifth schematic diagram of a structure of an electronic device according to an embodiment of this application.
Figure 7:
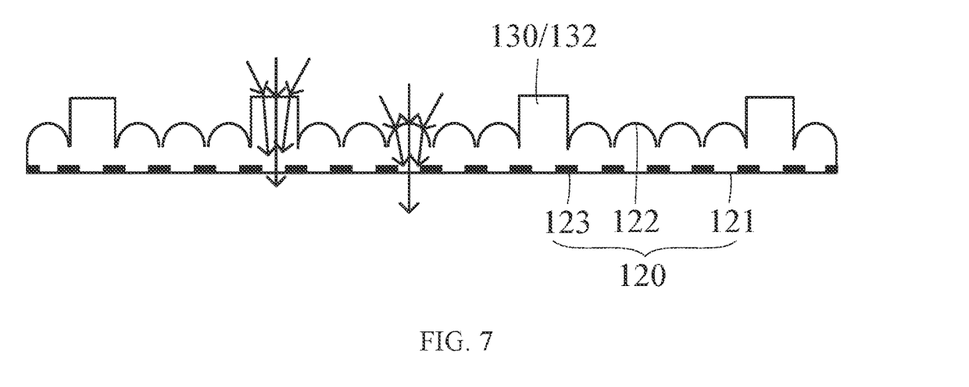
FIG. 7 is a schematic diagram of a structure of a microlens film and a support part in a fingerprint module according to an embodiment of this application.
Figure 8:
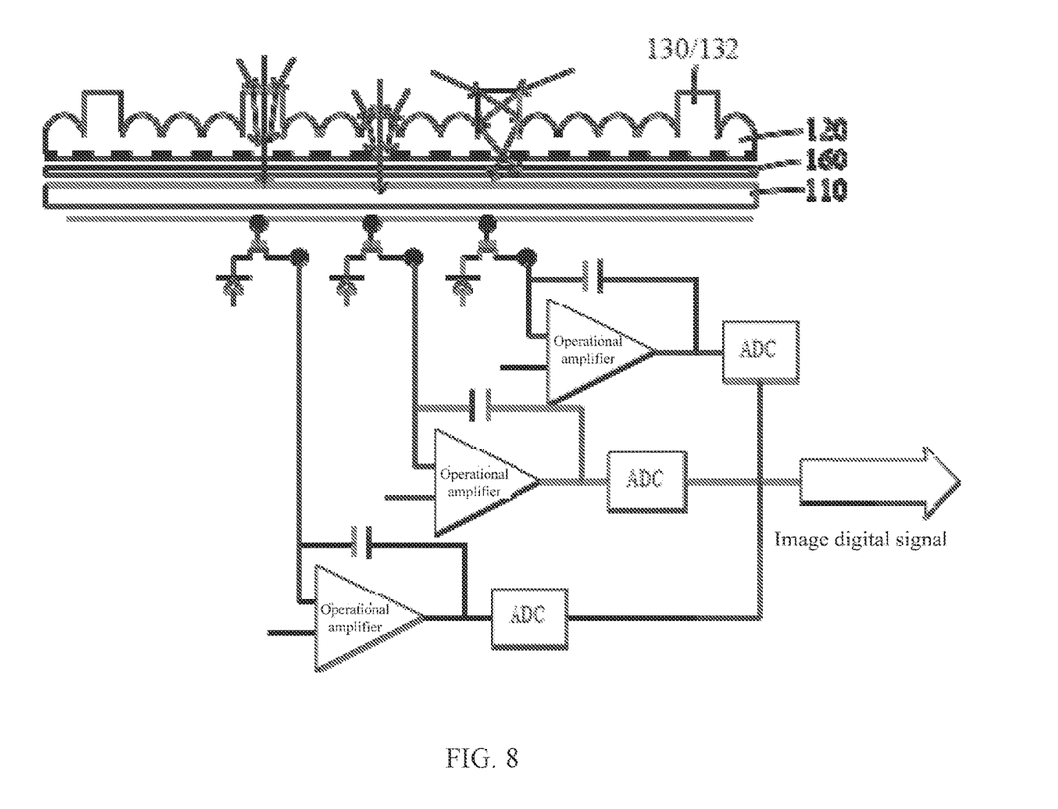
FIG. 8 is a schematic diagram of a structure of a fingerprint module according to an embodiment of this application.
Figure 9:
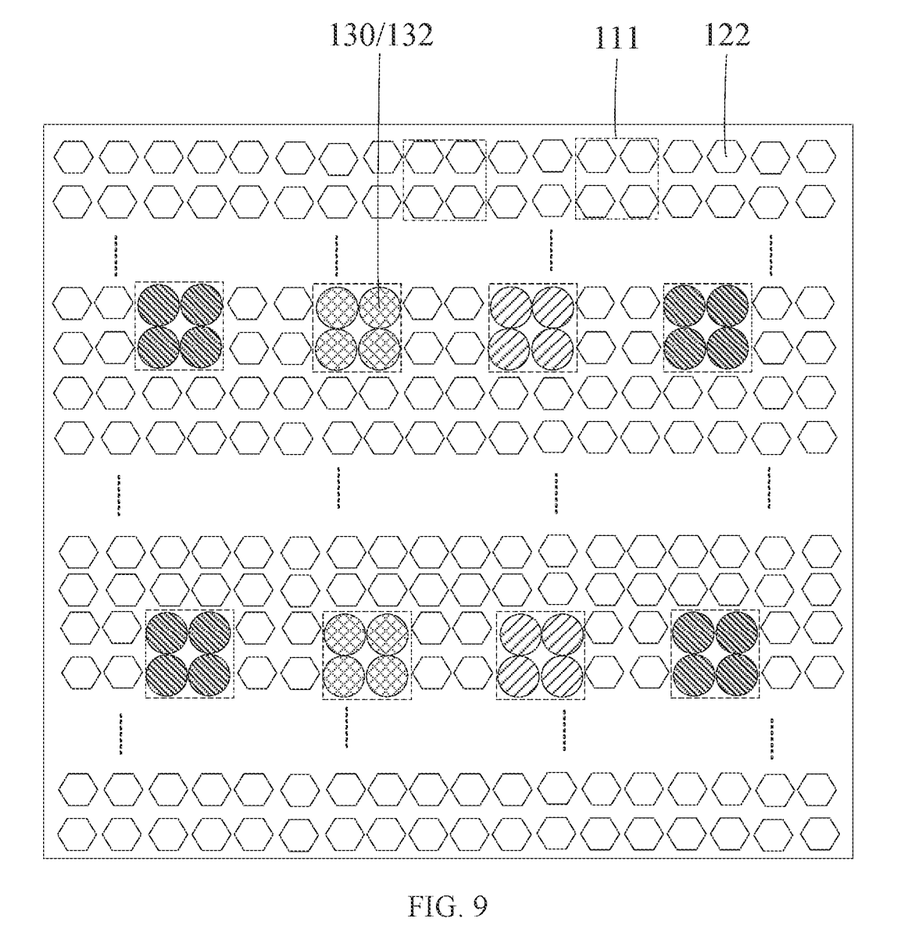
FIG. 9 is a top view of a structure of a microlens film in a fingerprint module according to an embodiment of this application.
Figure 10:
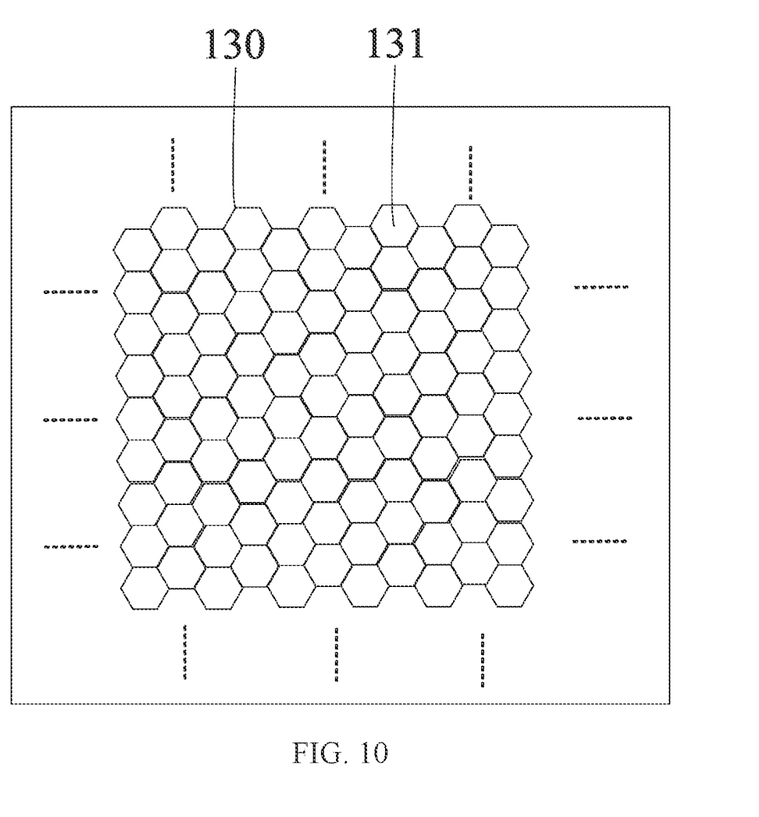
FIG. 10 is a top view of a support part of FIG. 5 or FIG. 6.

As shown in FIG. 9, N*N support parts 130 form a first sub-array, and the first sub-array corresponds to one pixel region 111. N*N light condensing protrusions 122 form a second sub-array, and the second sub-array corresponds to one pixel region 111. At least one second sub-array is disposed between two adjacent first sub-arrays. Colors of first color filter layers disposed on support parts 130 in a same first sub-array are the same. Colors of first color filter layers disposed on support parts 130 in two adjacent first sub-arrays may be different. In some implementations, the first sub-array can be a 2*2 array group, and the second sub-array may also be a 2*2 array group. The first sub-array and the second sub-array may also be other array groups, such as 3*3 array groups, 4*4 array groups, which is not limited in herein.

In some implementations, a filling structure may be disposed in the assembly gap 140. A third surface of the filling structure is connected to the first surface, a fourth surface of the filling structure is connected to the display module 200, and a refractive index of the filling structure is the first refractive index. The filling structure is filled in the assembly gap 140, to support the display module 200, improving bending resistance of the display module 200 and preventing the display module 200 from being deformed. In addition, the filling structure improves the bending resistance of the display module 200. Therefore, a distance between the fingerprint module 100 and the display module 200 can be reduced, that is, the assembly gap 140 is reduced, reducing an overall thickness of the electronic device.

In some implementations, the support part 130 may be embedded in the filling structure. When the display module 200 is subject to a large force, the filling structure is deformed. In this case, the support part 130 may provide an auxiliary support for the display module 200, to prevent the display module 200 from being further deformed.

In some implementations, the support part 130 may include the filling structure, and the refractive index of the filling structure is the first refractive index. In this case, the support part 130 is filled in the assembly gap 140, so that the support part 130 has a simple structure and a large support range.

In some implementations, the filling structure may be made of a material with a relatively low refractive index. For example, the filling structure may be UV glue. The UV glue is normally liquid and is cured after being irradiated by violet light (or ultraviolet light), so that the filling structure is easily bonded and processed. The cured UV glue has good adhesiveness, and can further enhance reliability of the electronic device. The filling material may also be another organic composite material. A specific material of the filling structure is not limited herein.

In some implementations, the microlens film 120 may have a plurality of light condensing protrusions 122. The plurality of light condensing protrusions 122 are arranged in an array on the first surface. The light condensing protrusions 122 are equivalent to convex lenses, and can further change scattered light into parallel light, increasing light entering the photosensitive unit 110 and further improving working performance of the photosensitive element. In addition, the plurality of light condensing protrusions 122 are arranged in an array on the first surface. Therefore, the light condensing protrusions 122 are arranged more regularly and have relatively compact structures.

In some implementations, the microlens film further includes a substrate 121, and the light condensing protrusions 122 are disposed on the substrate 121. The substrate 121 may be made of a polyethyleneterephthalate (PET) material, or other material, which is not limited herein.

In another alternative embodiment, there may be a plurality of support parts 130. The plurality of support parts 130 and the plurality of light condensing protrusions 122 may be arranged in an array on the first surface.

N*N support parts 130 form a first sub-array, and N*N light condensing protrusions 122 form a second sub-array. Each first sub-array corresponds to one pixel point in the display module 200, and each second sub-array corresponds to one pixel point in the display module 200, where N is a positive integer greater than or equal to 1. In this solution, the support part 130 affects only a pixel point corresponding to the support part 130, and does not affect other pixel points. Therefore, an influence on entire fingerprint imaging is reduced.

In some implementations, the support part 130 may be provided with a plurality of first light-transmitting holes 131. Axes of the first light-transmitting holes 131 are perpendicular to the display module 200 and the microlens film 120. In this case, light passes through the first light-transmitting holes 131 and then enters the microlens film 120. In this solution, a sidewall of the first light-transmitting hole 131 can absorb and block stray light, reducing interference of light between collimating holes on the microlens film 120.

Further, the plurality of light condensing protrusions 122 are arranged to be in a one-to-one correspondence with the plurality of first light-transmitting holes 131. In this solution, light in the first light-transmitting hole 131 is reflected by a corresponding light condensing protrusion 122, further reducing interference between light.

In some implementations, along an axial direction of the first light-transmitting hole 131, a projection of the light condensing protrusion 122 is within a projection outline of the first light-transmitting hole 131, or a projection of the light condensing protrusion 122 coincides with a projection of the first light-transmitting hole 131. In this solution, the light condensing protrusion 122 may be within the first light-transmitting hole 131, further reducing the interference between light and ensuring a good light shading effect. In some implementations, the support part 130 may be made of a black film material, achieving light shielding. The support part 130 is made of a material that can well absorb visible light or full wave-band light. In some implementations, the first light-transmitting hole 131 is coated with an ink coating to achieve light shielding.

In some implementations, the support part 130 may have a honeycomb structure. In this case, a connecting side wall between two adjacent first light-transmitting holes 131 is a light-shielding part of the first light-transmitting hole 131. Therefore, the side wall between two adjacent first light-transmitting holes 131 should be set thinner, which may not easily affect imaging of the fingerprint module 100.

In some implementations, the fingerprint module 100 may further include a light-shielding layer 123. The light-shielding layer 123 may be disposed on a second surface, facing the photosensitive unit 110, of the microlens film 120. The light-shielding layer 123 may be provided with a plurality of second light-transmitting holes. Each second light-transmitting hole is arranged to be opposite to one support part 130 or one light condensing protrusion 122. In this solution, the light-shielding layer 123 can shield and absorb large-angle light refracted by the support part 130, preventing influence of the large-angle light on imaging. In some implementations, the light-shielding layer 123 may be an ink coating coated on the second surface, and may also be another light-shielding material, which is not limited herein.

To further improve bending resistance of the display module 200, in some implementations, a support column 132 is further disposed in the first light-transmitting hole 131. A first end of the support column 132 is connected to the first surface, and a second end of the support column 132 is a second free end. When the display module 200 is subject to a large force and the support part 130 also bends, the support column 132 can support the display module 200, preventing the display module 200 from contacting the microlens film 120, and improving reliability of the fingerprint module 100.

In some implementations, a shape of the support column 132 matches a shape of the first light-transmitting hole 131, so that matching performance between the first light-transmitting hole 131 and the support column 132 is improved.

Further, the support column 132 may be coated with a second color filter layer, achieving anti-counterfeiting detection of an optical path of the fingerprint module 100, further improving reliability of the fingerprint module 100. A manner in which the second color filter layer is disposed is the same as a manner in which the first color filter layer is disposed. The details are not described herein again.

In some implementations, the fingerprint module 100 may further include an optical filter 160. The optical filter 160 may be disposed between the photosensitive unit 110 and the microlens film 120. In this solution, the optical filter 160 can absorb light with different wavelengths, filtering out light with different wavelengths, further obtaining light required for fingerprint imaging and improving reliability of fingerprint recognition.

Based on the fingerprint module 100 disclosed in embodiments of this application, an embodiment of this application further discloses an electronic device. The disclosed electronic device includes the fingerprint module 100 in any one of the foregoing embodiments. The electronic device disclosed in this embodiment of this application may further include a light-transmitting cover plate 300 and a display module 200. The light-transmitting cover plate 300 can cover the display module 200, and the fingerprint module 100 is located on a side, away from the light-transmitting cover plate 300, of the display module 200. In this solution, when the display module 200 is deformed, the display module 200 contacts a support part 130, but not directly contact a microlens film 120. Therefore, after light passes through the display module 200, because a refractive index of an assembly gap 140 is different from ta refractive index of the display module 200 and a refractive index of the microlens film 120, large-angle light is easily refracted or reflected when entering the microlens film 120, and then it is difficult for the large-angle light to form interference fringes, to improve reliability of the fingerprint module 100.

In addition, the light-transmitting cover plate 300 can protect the display module 200, preventing the display module 200 from being damaged. Further, it can be said that the light-transmitting cover plate 300 increases a thickness of the display module 200, improving rigidity of the display module 200, further improving bending resistance of the display module 200.

The electronic device disclosed in this embodiment of this application may be a smart watch, smart phone, tablet computer, or another device, and a specific type of the electronic device is not limited in this embodiment of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

The invention claimed is:

1. A fingerprint apparatus of an electronic device, comprising:
   a photosensitive unit;
   a microlens film; and
   a support part, wherein:
      the photosensitive unit and a display of the electronic device are arranged to be opposite to each other;
      the microlens film is disposed between the photosensitive unit and the display;
      an assembly gap is between the microlens film and the display;
      a first distance between the support part and the display is smaller than a second distance between the microlens film and the display;
      and
      the support part comprises a first free end, and when the display is in a deformed state, the first free end contacts the display.

2. The fingerprint apparatus according to claim 1, wherein a first end of the support part is disposed on a first surface of the microlens film facing the display, and a second end of the support part is the first free end.

3. The fingerprint apparatus according to claim 2, wherein a plurality of support parts are arranged on the first surface at intervals.

4. The fingerprint apparatus according to claim 3, wherein the plurality of support parts are arranged on the first surface in an array, and outer surfaces of the support parts are provided with first color filter layers.

5. The fingerprint apparatus according to claim 4, wherein along a first arrangement direction of the plurality of support parts, colors of filtered light corresponding to the first color filter layers of two adjacent support parts are different.

6. The fingerprint apparatus according to claim 3, wherein:
the photosensitive unit comprises a plurality of pixel regions are arranged at intervals;
at least one support part is disposed in a region that is corresponding to each pixel region on the first surface; and
in a direction perpendicular to the photosensitive unit, a projection of the at least one support part is located in one of the pixel regions corresponding to the support part, or a projection of the at least one support part coincides with one of the pixel region corresponding to the support part.

7. The fingerprint apparatus according to claim 1, wherein:
the assembly gap has a first refractive index;
the display has a second refractive index;
the microlens film has a third refractive index;
the first refractive index is different from the second refractive index;
the first refractive index is different from the third refractive index;
a filling structure is disposed in the assembly gap;
a third surface of the filling structure is connected to the first surface;
a fourth surface of the filling structure is connected to the display; and
a refractive index of the filling structure is the first refractive index; or wherein:
the support part comprises the filling structure; and
the refractive index of the filling structure is the first refractive index.

8. The fingerprint apparatus according to claim 1, wherein:
the microlens film has a plurality of light condensing protrusions; and
the plurality of light condensing protrusions are arranged in an array on the first surface.

9. The fingerprint apparatus according to claim 8, wherein:
a plurality of support parts and the plurality of light condensing protrusions are arranged in an array on the first surface;
N*N support parts form a first sub-array;
N*N light condensing protrusions form a second sub-array;
each first sub-array corresponds to one pixel point in the display; and
each second sub-array corresponds to one pixel point in the display, wherein N is a positive integer greater than or equal to 1.

10. The fingerprint apparatus according to claim 8, wherein:
the support part is provided with a plurality of first light-transmitting holes; and
axes of the first light-transmitting holes are perpendicular to the display and the microlens film.

11. The fingerprint apparatus according to claim 10, wherein:
the support part has a honeycomb structure; and
a connecting side wall between two adjacent first light-transmitting holes is a light-shielding part of the first light-transmitting holes.

12. The fingerprint apparatus according to claim 10, wherein the plurality of light condensing protrusions are arranged in a one-to-one correspondence with the plurality of first light-transmitting holes.

13. The fingerprint apparatus according to claim 12, wherein:
along an axial direction of the first light-transmitting hole, a projection of the light condensing protrusion is within a projection outline of the first light-transmitting hole, or the projection of the light condensing protrusion coincides with the projection of the first light-transmitting hole.

14. The fingerprint apparatus according to claim 8, further comprising:
a light-shielding layer disposed on a second surface, facing the photosensitive unit, of the microlens film, wherein the light-shielding layer is provided with a plurality of second light-transmitting holes, and each second light-transmitting hole is arranged to be opposite to one support part or one light condensing protrusion.

15. The fingerprint apparatus according to claim 1, further comprising:
an optical filter disposed between the photosensitive unit and the microlens film.

16. The fingerprint apparatus according to claim 1, wherein a support column is disposed in a first light-transmitting hole, a first end of the support column is connected to the first surface, and a second end of the support column is a second free end.

17. The fingerprint apparatus according to claim 16, wherein a shape of the support column matches that of the first light-transmitting hole.

18. The fingerprint apparatus according to claim 16, wherein the support column is coated with a second color filter layer.

19. An electronic device, comprising:
a light-transmitting cover plate;
a display; and
a fingerprint apparatus,
wherein the light-transmitting cover plate covers the display, and the fingerprint apparatus is located on a side, away from the light-transmitting cover plate, of the display,
wherein the fingerprint apparatus comprises:
a photosensitive unit;
a microlens film; and
a support part, wherein:
the photosensitive unit and the display of the electronic device are arranged to be opposite to each other;
the microlens film is disposed between the photosensitive unit and the display;
an assembly gap is between the microlens film and the display;
a first distance between the support part and the display is smaller than a second distance between the microlens film and the display; and
the support part comprises a first free end, and when the display is in a deformed state, the first free end contacts the display.

20. A fingerprint apparatus of an electronic device, comprising: a photosensitive unit; a microlens film; and a support part, wherein: the photosensitive unit and a display of the electronic device are arranged to be opposite to each other; the microlens film is disposed between the photosensitive unit and the display; an assembly gap is between the microlens film and the display; a first surface, facing the display, of the microlens film is provided with the support part; a first distance between the support part and the display is smaller than a second distance between the microlens film and the display; the support part is provided with a plurality of first light-transmitting holes; wherein: the support part has a honeycomb structure; and a connecting side wall between two adjacent first light-transmitting holes is a light-shielding part of the first light-transmitting holes.

* * * * *